US012368253B2

(12) United States Patent
Yang et al.

(10) Patent No.: US 12,368,253 B2
(45) Date of Patent: Jul. 22, 2025

(54) COMPACT CABLE CONNECTOR AND CONNECTOR ASSEMBLY WITH STABILITY

(71) Applicant: AMPHENOL ASSEMBLETECH (XIAMEN) CO., LTD, Fujian (CN)

(72) Inventors: Wenchu Yang, Fujian (CN); Weishun Chen, Fujian (CN); Chungang Zhang, Fujian (CN); Zhenxing Liu, Fujian (CN); Haitao Xiong, Fujian (CN); Hang Li, Fujian (CN)

(73) Assignee: AMPHENOL ASSEMBLETECH (XIAMEN) CO., LTD, Xiamen (CN)

( * ) Notice: Subject to any disclaimer, the term of this patent is extended or adjusted under 35 U.S.C. 154(b) by 385 days.

(21) Appl. No.: 18/099,270

(22) Filed: Jan. 20, 2023

(65) Prior Publication Data

US 2023/0318209 A1 Oct. 5, 2023

(30) Foreign Application Priority Data

Mar. 31, 2022 (CN) ......................... 202210336235.2

(51) Int. Cl.

| | |
|---|---|
| ***H01R 12/70*** | (2011.01) |
| ***H01R 12/75*** | (2011.01) |
| ***H01R 13/631*** | (2006.01) |
| ***H01R 13/633*** | (2006.01) |
| ***H01R 13/64*** | (2006.01) |

(52) U.S. Cl.

CPC ......... *H01R 12/7005* (2013.01); *H01R 12/75* (2013.01); *H01R 13/631* (2013.01); *H01R 13/633* (2013.01); *H01R 13/64* (2013.01)

(58) Field of Classification Search

CPC .. H01R 12/7005; H01R 12/75; H01R 13/631; H01R 13/633; H01R 13/64; H01R 13/641; H01R 12/79; H01R 13/6335; H01R 13/639; H01R 13/514; H01R 24/00

See application file for complete search history.

(56) References Cited

U.S. PATENT DOCUMENTS

| | | | | |
|---|---|---|---|---|
| 10,193,268 | B1 * | 1/2019 | Chow | H01R 12/53 |
| 11,515,655 | B2 * | 11/2022 | Yang | H01R 13/639 |
| 2009/0088011 | A1 * | 4/2009 | Hsieh | H01R 12/721 439/171 |
| 2012/0156900 | A1 * | 6/2012 | Wu | H01R 13/6658 439/352 |
| 2020/0006898 | A1 * | 1/2020 | Yang | H01R 13/6471 |
| 2022/0404570 | A1 * | 12/2022 | Shah | G02B 6/4284 |

* cited by examiner

*Primary Examiner* — Travis S Chambers

(57) ABSTRACT

Disclosed are a cable connector and a connector assembly. The cable connector includes a first insulator, wherein the lower side of the first insulator is provided with a first plane and a second plane, an accommodating groove is formed in the first insulator, the first plane is provided with a first groove opening communicating with the accommodating groove, the second plane is provided with at least one second groove opening communicating with the accommodating groove, and one side face of the insulator is provided with a cable outlet communicating with the accommodating groove; a printed circuit board, arranged in the accommodating groove, wherein a lower end of the printed circuit board is provided with a first plugboard portion and at least one second plugboard portion, and the first plugboard portion and the second plugboard portion are both provided with electrical connection portions.

19 Claims, 5 Drawing Sheets

COMPACT CABLE CONNECTOR AND CONNECTOR ASSEMBLY WITH STABILITY

CROSS REFERENCE TO RELATED APPLICATIONS

The present application claims the benefit of Chinese Patent Application No. 202210336235.2 filed on Mar. 31, 2022, the contents of which are incorporated herein by reference in their entirety.

FIELD OF TECHNOLOGY

The present invention belongs to the technical field of connectors, and in particular relates to a cable connector and a connector assembly.

BACKGROUND

At present, a high-speed connector is usually provided with only one terminal set and electrical connection portions. However, when multiple interfaces are required for plugging, the number of connectors needing to be used is large, leading to large overall space occupation, which is not conducive to product layout. Moreover, in the process of plugging and unplugging and assembling the connector, the good plugging and unplugging performance and assembling stability are particularly important. Therefore, it is expected to develop a cable connector which can connect a plurality of electrical connection portions, has a compact structure and good stability during plugging and unplugging and assembling.

SUMMARY

For the defects in the prior art, an objective of the present invention is to provide a cable connector and a connector assembly. A first plugboard portion and a second plugboard portion are integrated by the cable connector. The first plugboard portion and the second plugboard portion are provided with independent electrical connection portions. A step formed by a first plane and a second plane, the arrangement of a first plugging portion and a second plugging portion and the arrangement of a first positioning portion can improve the stability during plugging and unplugging and assembling.

To achieve the objective above, the present invention provides a cable connector. The cable connector includes:

- a first insulator, wherein the lower side of the first insulator is provided with a first plane and a second plane, a vertical height of the first plane is higher than that of the second plane, a step is formed at a joint of the first plane and the second plane, an accommodating groove is formed in the first insulator, the first plane is provided with a first groove opening communicating with the accommodating groove, the second plane is provided with at least one second groove opening communicating with the accommodating groove, and one side face of the insulator is provided with a cable outlet communicating with the accommodating groove;
- a printed circuit board, arranged in the accommodating groove, wherein a lower end of the printed circuit board is provided with a first plugboard portion and at least one second plugboard portion, the first plugboard portion and the second plugboard portion respectively penetrate through the first groove opening and the second groove opening and extend downwards, and the first plugboard portion and the second plugboard portion are both provided with electrical connection portions;
- a first plugging portion and a second plugging portion, respectively arranged on the lower sides of the first plane and the second plane and extending downwards; and
- a first positioning portion, arranged on the lower side of the first plane and extending downwards, wherein the first positioning portion is located between the first plugging portion and the second plugging portion.

Alternatively, a partition portion is arranged between the adjacent second groove openings, and a first clearance is provided between the adjacent second plugboard portions.

Alternatively, the first plugging portion is arranged on the front side and the rear side of the first plugboard portion, and the second plugging portions are arranged on the front side and the rear side of each of the second plugboard portions.

Alternatively, the first plugging portion is arranged on the front side of the first plugboard portion, and the second plugboard portion is arranged on at least the front side of each of the second plugboard portions.

Alternatively, there is one second plugboard portion.

Alternatively, a second clearance is provided between the adjacent second plugging portions.

Alternatively, the second plugging portion includes a second front plugging portion located on the front side of the second plugboard portion and a second rear plugging portion located on the rear side of the second plugboard portion. The second front plugging portion and the second rear plugging portion have different lengths in a length direction of the first insulator.

Alternatively, the first positioning portion is arranged on the front side and the rear side of the first plugboard portion, a third clearance is provided between the first positioning portion and the first plugging portion adjacent to the first positioning portion, and a fourth clearance is provided between the first positioning portion and the second plugging portion adjacent to the first positioning portion.

Alternatively, the cable connector further includes two second positioning portions. The two second positioning portions are respectively arranged on the left side face and the right side face of the first insulator and extend downwards, a fifth clearance is provided between one of the second positioning portions and the first plugging portion, and a sixth clearance is provided between the other of the second positioning portions and the second plugging portion.

Alternatively, the second positioning portion is platy.

Alternatively, the first plugging portion and the second plugging portion are platy, and the first positioning portion is columnar.

Alternatively, the electrical connection portions include a first electrical connection portion, a second electrical connection portion and a third electrical connection portion. The first electrical connection portion and the second electrical connection portion are arranged on the first plugboard portion, and a seventh clearance is provided between the first electrical connection portion and the second electrical connection portion. Each of the third electrical connection portions is arranged on one of the second plugboard portions.

Alternatively, the first electrical connection portion, the second electrical connection portion and the third electrical connection portion are connected to a first cable, a second cable and a third cable, respectively. The first cable, the second cable and the third cable extend out via the cable outlet.

Alternatively, there are two second plugboard portions.

Alternatively, the front side of the second plugboard portion is provided with a mounting groove, a lock latch is arranged in the mounting groove, and the lock latch includes a lock plate bent into a U shape. One face of the lock plate is clamped into the mounting groove, the other face of the lock plate is a free end exposed to the outside, the outer side of the other face of the lock plate is provided with a convex lock tab, and an upper end of the other face of the lock plate is provided with a pull tab.

Alternatively, the front side face of the first insulator is provided with a protruded portion, the first plugging portion and the first positioning portion are arranged at the bottom of the protruded portion.

Alternatively, one side face of the first insulator is provided with a cylindrical portion extending outwards, and the cylindrical portion is arranged on the periphery of the cable outlet and surrounds the cable outlet.

The present invention further provides a connector assembly. The connector assembly includes the cable connector above and a board connector.

Alternatively, the board connector includes:

- a second insulator, wherein the upper side of the second insulator is provided with a third plane and a fourth plane in butt joint with the first plane and a second plane, respectively, a first terminal set and a second terminal set with the tops exposed to the outside are arranged in the second insulator, and the electrical connection portions on the first plugboard portion and the second plugboard portion are in plug-fit with the first terminal set and the second terminal set, respectively; and
- a housing, sleeved outside the second insulator, wherein a first plugging slot and a second plugging slot are formed between at least one of the front side face and the rear side face of the second insulator and the housing, at least part of the front end face and/or the rear end face of the housing is recessed inwards to form a positioning slot, the first plugging portion, the second plugging portion and the first positioning portion are in plug-fit with the first plugging slot, the second plugging portion and the positioning slot, respectively.

The cable connector and the connector assembly provided by the present invention have the beneficial effects as follows:

1. The first plugboard portion and the second plugboard portion are integrated by the cable connector. The first plugboard portion and the second plugboard portion are provided with independent electrical connection portions. The step formed by the first plane and the second plane, the arrangement of the first plugging portion and the second plugging portion and the arrangement of the first positioning portion can improve the stability during plugging and unplugging and assembling.
2. In accordance with the cable connector, the front side and the rear side of the first plugboard portion are both provided with the first plugging portions, the front side and the rear side of the second plugboard portion are both provided with the second plugging portions, and thus the plugging and unplugging stability can be further improved, and the oblique plugging is avoided.

3. The second front plugging portion and the second rear plugging portion of the cable connector have different lengths in a length direction of the first insulator, thus avoiding reverse plugging.
4. The cable connector is further provided with a second positioning portion, which is configured for further guidance and positioning in the length direction during plugging and unplugging, thus improving the plugging stability.

Other features and advantages of the invention will be described in detail in the detailed description which follows.

BRIEF DESCRIPTION OF THE DRAWINGS

The above and other objects, features and advantages of the present invention will become more apparent from a more detailed description of exemplary embodiments of the present invention with combination of the accompanying drawings, wherein the same reference numerals generally refer to the same parts in the exemplary embodiments of the present invention.

In the drawings.

Figure 1:
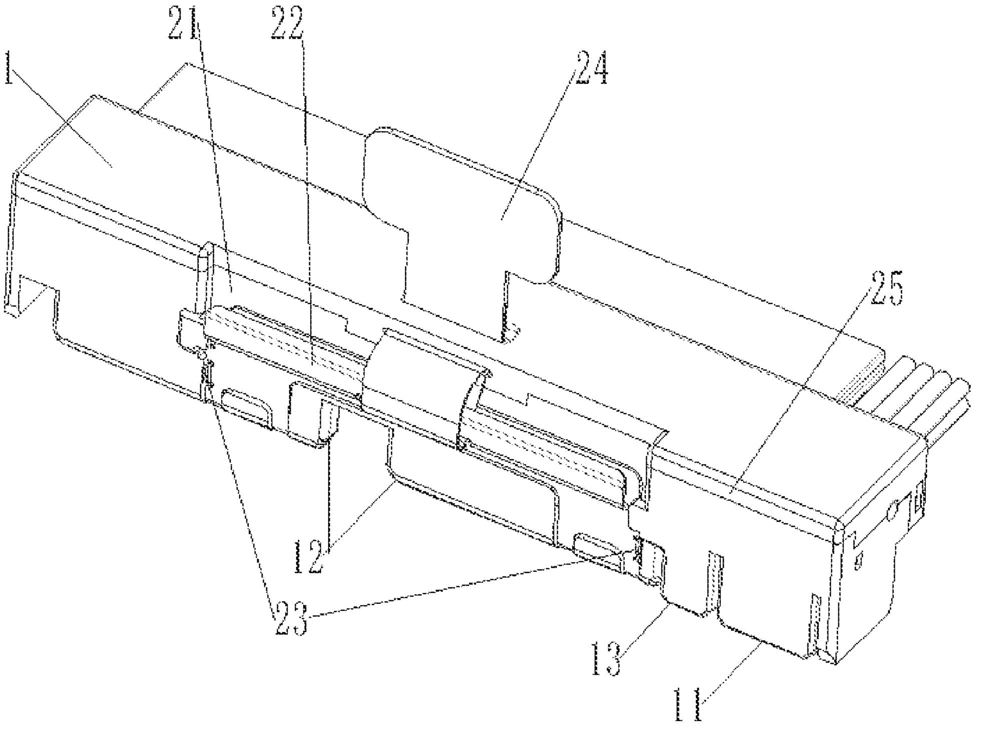
FIG. 1 shows a schematic diagram of a three-dimensional structure of a cable connector in accordance with an embodiment of the present invention from one perspective.

1—First insulator; 2—first plane; 3—second plane; 4—step; 5—first groove opening; 6—second groove opening; 7—cable outlet; 8—printed circuit board; 9—first plugboard portion; 10—second plugboard portion; 11—first plugging portion; 12—second plugging portion; 13—first positioning portion; 14—partition portion; 15—second front plugging portion; 16—second rear plugging portion; 17—second positioning portion; 18—first electrical connection portion; 19—second electrical connection portion; 20—third electrical connection portion; 21—mounting groove;

22—lock latch; 23—lock tab; 24—pull tab; 25—protruded portion; 26—cylindrical portion; 27—housing; 28—positioning slot.

DESCRIPTION OF THE EMBODIMENTS

Preferred embodiments of the present invention will be described in more detail below. While the present invention has been described in terms of the preferred embodiments of the present invention, it should be understood that the present invention may be embodied in a variety of forms and should not be limited by the embodiments set forth herein. Rather, these embodiments are provided so that this disclosure will be thorough and complete, and the scope of the present invention may be fully conveyed to those skilled in the art.

The present invention provides a cable connector. The cable connector includes:

- a first insulator, wherein lower side of the first insulator is provided with a first plane and a second plane, a vertical height of the first plane is higher than that of the second plane, a step is formed at a joint of the first plane and the second plane, an accommodating groove is formed in the first insulator, the first plane is provided with a first groove opening communicating with the accommodating groove, the second plane is provided with at least one second groove opening communicating with the accommodating groove, and one side face of the insulator is provided with a cable outlet communicating with the accommodating groove;
- a printed circuit board, arranged in the accommodating groove, wherein a lower end of the printed circuit board is provided with a first plugboard portion and at least one second plugboard portion, the first plugboard portion and the second plugboard portion respectively penetrate through the first groove opening and the second groove opening and extend downwards, and the first plugboard portion and the second plugboard portion are both provided with electrical connection portions;
- a first plugging portion and a second plugging portion, respectively arranged on the lower sides of the first plane and the second plane and extending downwards; and
- a first positioning portion, arranged on the lower side of the first plane and extending downwards, wherein the first positioning portion is located between the first plugging portion and the second plugging portion.

Specifically, through the arrangement of the first groove opening and the second groove opening and the arrangement of the first plugboard portion and the second plugboard portion, a plurality of electrical connection portions can be integrated by the cable connector so as to achieve the integrated design of the cable electrical connector and save the space. Moreover, through the step formed at the joint of the first plane and the second plane, the arrangement of the first plugging portion and the second plugging portion and the arrangement of the first positioning portion, the plug-fit with the corresponding structures on a board connector is achieved, and the stability during plugging and unplugging and assembling is improved.

Further, there may be one or more accommodating grooves and one or more printed circuit boards, respectively.

Alternatively, a partition portion is arranged between the adjacent second groove openings, and a first clearance is provided between the adjacent second plugboard portions.

Specifically, the first clearance is provided between the adjacent second plugboard portions to make each of the second plugboard portions form an independent plugging-unplugging structure, which not only can provide an independent electrical connection portion on the second plugboard portion, but also can improve the stability during plugging and unplugging.

Alternatively, the first plugging portions are arranged on the front side and the rear side of the first plugboard portion, and the second plugging portions are arranged on the front side and the rear side of each of the second plugboard portions.

Specifically, in accordance with the cable connector, the front side and the rear side of the first plugboard portion are both provided with the first plugging portions, and the front side and the rear side of the second plugboard portion are both provided with the second plugging portions, and thus the plugging and unplugging stability can be further improved, and the oblique plugging is avoided.

Alternatively, the first plugging portion is arranged on the front side of the first plugboard portion, and the second plugging portion is arranged on at least the front side of each of the second plugboard portions.

Specifically, in an example, the first plugging portion may be only arranged on the front side of the first plugboard portion, while the second plugging portions may be arranged on the front side of the second plugboard portion, or arranged on the front side and the rear side of the second plugboard portion.

Alternatively, there is one second plugboard portion.

Alternatively, a second clearance is provided between the adjacent second plugging portions.

Specifically, the second clearance is provided between the adjacent second plugging portions so as to form plugging and unplugging structures independent of each other, thus improving the plugging stability.

Alternatively, the second plugging portion includes a second front plugging portion located on the front side of the second plugboard portion and a second rear plugging portion located on the rear side of the second plugboard portion, and the second front plugging portion and the second rear plugging portion have different lengths in a length direction of the first insulator.

Specifically, the second front plugging portion and the second rear plugging portion of the cable connector have different lengths in the length direction of the first insulator, thus avoiding reverse plugging.

Alternatively, the first positioning portions are arranged on the front side and the rear side of the first plugboard portion, a third clearance is provided between the first positioning portion and the first plugging portion adjacent to the first positioning portion, and a fourth clearance is provided between the first positioning portion and the second plugging portion adjacent to the first positioning portion.

Specifically, the first positioning portions are respectively arranged on the front side and the rear side of the first plugboard portion to form plugging-positioning structures independent of the first plugging portion and the second plugging portion through the arrangement of the third clearance and the fourth clearance, thus further improving the plugging and unplugging stability. The first positioning portions may adapt to positioning slots on a board connector to form a plug type structure with the positioning slots.

Alternatively, the cable connector further includes two second positioning portions. The two positioning portions are respectively arranged on the left side face and the right side face of the first insulator and extend downwards. A fifth clearance is provided between one of the second positioning portions and the first plugging portion, and a sixth clearance is provided between the other of the second positioning portions and the second plugging portion.

Specifically, when the cable connector is plugged into the corresponding board connector, the two second positioning portions are respectively attached to the outer side of a housing of the board connector to play a role in plugging positioning and guiding. The second positioning portions are used for further guidance and positioning in the length during plugging and unplugging, thus improving the plugging stability.

Alternatively, the second positioning portion is platy.

Alternatively, the first plugging portion and the second plugging portion are platy, and the first positioning portion is columnar.

Specifically, the first positioning portion is in fit with the shape of the positioning slot on the board connector and forms a plug type structure with the positioning slot.

Alternatively, the electrical connection portions include a first electrical connection portion, a second electrical connection portion and a third electrical connection portion. The first electrical connection portion and the second electrical connection portion are arranged on the first plugboard portion, a seventh clearance is provided between the first electrical connection portion and the second electrical connection portion; and each of the third electrical connection portions is arranged on one of the second plugboard portions.

Specifically, the first electrical connection portion, the second electrical connection portion and the third electrical connection portion may independently achieve the own electrical connection, respectively, thus achieving the integrated design of the electrical connection portions.

In an example, one of the first electrical connection portion, the second electrical connection portion and the third electrical connection portion is a power supply connection portion, and at least one of the first electrical connection portion, the second electrical connection portion and the third electrical connection portion is a signal connection portion.

Further, the first electrical connection portion is the power supply connection portion, and the second electrical connection portion is the sideband signal connection portion.

Specifically, the cable connector achieves the integration of power supply connection and sideband signal connection through the arrangement of the power supply connection portion and a differential signal connection portion. The function of the cable connector is expanded, the multi-functional integrated design is achieved, and the integration of the functions of the electrical connector is achieved on the basis of achieving the integration of the number of the electric connectors.

Furthermore, the third electrical connection portion includes at least one of a sideband signal connection portion and a differential signal connection portion.

Specifically, at least one of a sideband signal and a differential signal may be selected as a signal transmitted by the third electrical connection portion as required, thus achieving the diversity of the signal transmission.

Alternatively, the first electrical connection portion, the second electrical connection portion and the third electrical connection portion are connected to a first cable, a second cable and a third cable, respectively. The first cable, the second cable and the third cable extend out via the cable outlet.

Specifically, the first cable, the second cable and the third cable may be encapsulated in the cable outlet to achieve the respective signal transmission of the first electrical connection portion, the second electrical connection portion and the third electrical connection portion.

Alternatively, there are two second plugboard portions.

Alternatively, the front side of the second plugboard portion is provided with a mounting groove, a lock latch is arranged in the mounting groove, and the lock latch includes a lock plate bent into a U shape. One face of the lock plate is clamped into the mounting groove, the other face of the lock plate is a free end exposed to the outside, the outer side of the other face of the lock plate is provided with a convex lock tab, and the upper end of the other face of the lock plate is provided with a pull tab.

Specifically, the lock plate bent into the U shape is elastic. When the pull tab is pulled or the other face of the lock plate is pressed, the lock tab on the other face of the lock plate is driven to retract from a lock hole on the board connector, and the cable connector can be unplugged at the moment.

Further, the mounting groove includes a left mounting groove and a right mounting groove. The left mounting groove and the right mounting groove are respectively located on the two adjacent second front plugging portions. The lock latch is arranged on the ends, close to each other, of the two second front plugging portions to guarantee that the two lock tabs on the lock plate are centered on the first insulator as much as possible, and thus the two lock tabs may be stressed uniformly.

Alternatively, the front side face of the first insulator is provided with a protruded portion, the first plugging portion and the first positioning portion are arranged at the bottom of the protruded portion.

Specifically, in order to adapt to the dimension of the housing where the first terminal set and the second terminal set of the board connector are located, the end face of the first insulator is provided with a protruded portion, and the first plugging portion and the first positioning portion are located at the bottom of the protruded portion, and the first plugging portion and the first positioning portion protrude outwards compared to the second plugging portion.

Alternatively, one side face of the first insulator is provided with a cylindrical portion extending outwards, and the cylindrical portion is arranged on the periphery of the cable outlet and surrounds the cable outlet.

Specifically, the arrangement of the cylindrical portion provides limiting and guidance for the outgoing first cable, second cable and third cable better, and form a good encapsulation for the cables therein, thus protecting the connection points of the cables and the printed circuit board.

The present invention further provides a connector assembly. The connector assembly includes the cable connector above and a board connector.

Alternatively, the board connector includes:

- a second insulator, wherein the upper side of the second insulator is provided with a third plane and a fourth plane in butt joint with the first plane and a second plane, respectively, a first terminal set and a second terminal set with tops exposed to the outside are arranged in the second insulator, and the electrical connection portions on the first plugboard portion and the second plugboard portion are in plug-fit with the first terminal set and the second terminal set, respectively; and
- a housing, sleeved outside the second insulator, wherein a first plugging slot and a second plugging slot are formed between at least one of the front side face and the rear side face of the second insulator and the housing, at least part of the front end face and/or the rear end face of the housing is recessed inwards to form a positioning slot, the first plugging portion, the second plugging portion and the first positioning portion are in plug-fit with the first plugging slot, the second plugging portion and the positioning slot, respectively.

Specifically, as the board connector integrated with the first terminal set and the second terminal set is used by the connector assembly to be in plug-fit with the cable connector above, the connector assembly achieves the integrated plugging, which is not only saved in space and easy to assemble, but also can keep the outgoing cables neat. Through the arrangement of the third plane and the fourth plane, the first plugging slot, the second plugging slot and the positioning slot on the board connector, the board connector forms a multi-directional plug-fit with the cable connector, and the stability of the connector assembly during plugging and unplugging and assembling is improved.

First Embodiment

Figure 2:
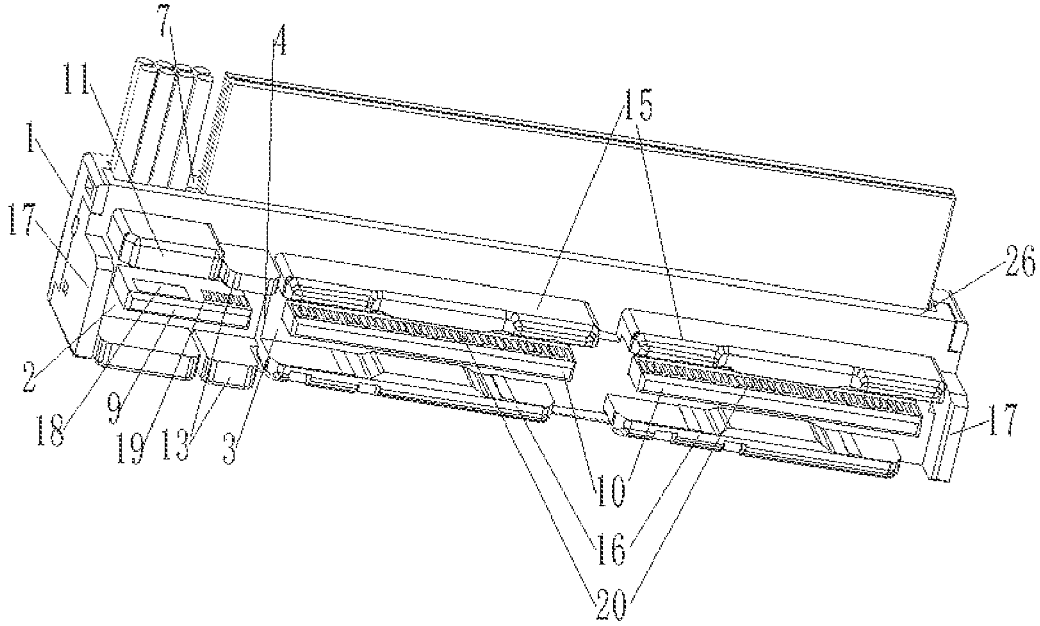
FIG. 2 shows a schematic diagram of a three-dimensional structure of a cable connector in accordance with an embodiment of the present invention from another perspective.

As shown in FIG. 1 and FIG. 2, the present invention provides a cable connector. The cable connector includes:

a first insulator 1, wherein the lower side of the first insulator 1 is provided with a first plane 2 and a second plane 3, a vertical height of the first plane 2 is higher than that of the second plane 3, a step 4 is formed at a joint of the first plane 2 and the second plane 3, an accommodating groove is formed in the first insulator 1, the first plane 2 is provided with a first groove opening 5 communicating with the accommodating groove, the second plane 3 is provided with at least one second groove opening 6 communicating with the accommodating groove, and one side face of the insulator is provided with a cable outlet 7 communicating with the accommodating groove;

a printed circuit board 8, arranged in the accommodating groove, wherein a lower end of the printed circuit board 8 is provided with a first plugboard portion 9 and at least one second plugboard portion 10, the first plugboard portion 9 and the second plugboard portion 10 respectively penetrate through the first groove opening 5 and the second groove opening 6 and extend downwards, and the first plugboard portion 9 and the second plugboard portion 10 are both provided with electrical connection portions;

a first plugging portion 11 and a second plugging portion 12, respectively arranged on the lower sides of the first plane 2 and the second plane 3 and extending downwards; and a first positioning portion 13, arranged on the lower side of the first plane 2 and extending downwards, wherein the first positioning portion 13 is located between the first plugging portion 11 and the second plugging portion 12.

In accordance with the embodiment, a partition portion 14 is arranged between the adjacent second groove openings 6, and a first clearance is provided between the adjacent second plugboard portions 10.

In accordance with the embodiment, the first plugging portions 11 are arranged on the front side and the rear side of the first plugboard portion 9, and the second plugging portions 12 are arranged on the front side and the rear side of each of the second plugboard portions 10.

In accordance with the embodiment, a second clearance is provided between the adjacent second plugging portions 12.

In accordance with the embodiment, the second plugging portions 12 include a second front plugging portion 15 located on the front side of the second plugboard portion 10 and a second rear plugging portion 16 located on the rear side of the second plugboard portion 10, and the second front plugging portion 15 and the second rear plugging portion 16 have different lengths in the length direction of the first insulator 1.

In accordance with the embodiment, the first positioning portions 13 are arranged on the front side and the rear side of the first plugboard portion 9, a third clearance is provided between the first positioning portion 13 and the first plugging portion 11 adjacent to the first positioning portion, and a fourth clearance is provided between the first positioning portion 13 and the second plugging portion 12 adjacent to the first positioning portion.

In accordance with the embodiment, the cable connector includes two second positioning portions 17. The two second positioning portions 17 are respectively arranged on the left side face and the right side face of the first insulator 1 and extend downwards. A fifth clearance is provided between one of the second positioning portions 17 and the first plugging portion 11, and a sixth clearance is provided between the other of the second positioning portions 17 and the second plugging portion 12.

In accordance with the embodiment, the second positioning portion 17 is platy.

In accordance with the embodiment, the first plugging portion 11 and the second plugging portion 12 are platy, and the first positioning portion 13 is columnar.

In accordance with the embodiment, the electrical connection portions include a first electrical connection portion 18, a second electrical connection portion 19 and a third electrical connection portion 20. The first electrical connection portion 18 and the second electrical connection portion 19 are arranged on the first plugboard portion 9, a seventh clearance is provided between the first electrical connection portion 18 and the second electrical connection portion 19; and each of the third electrical connection portions 20 is arranged on one of the second plugboard portions 10.

In accordance with the embodiment, the first electrical connection portion 18, the second electrical connection portion 19 and the third electrical connection portion 20 are respectively connected to a first cable, a second cable and a third cable. The first cable, the second cable and the third cable all extend outwards via a cable outlet 7.

In accordance with the embodiment, the cable outlet 7 is formed in the front side or the rear side of the first insulator 1.

In accordance with the embodiment, there are two second plugboard portions 10.

In accordance with the embodiment, the front side of the second plugboard portion 10 is provided with a mounting groove 21. A lock latch 22 is arranged in the mounting groove 21, and the lock latch 22 includes a lock plate bent into the U shape. One face of the lock plate is clamped into the mounting groove, the other face of the lock plate is a free end exposed to the outside, the outer side of the other face of the lock plate is provided with a convex lock tab 23, and an upper end of the other face of the lock plate is provided with a pull tab 24.

In accordance with the embodiment, the front side face of the first insulator 1 is provided with a protruded portion 25, the first plugging portion 11 and the first positioning portion 13 are arranged at the bottom of the protruded portion 25.

In accordance with the embodiment, one side face of the first insulator 1 is provided with a cylindrical portion 26 extending outwards, and the cylindrical portion 26 is arranged on the periphery of the cable outlet 7 and surrounds the cable outlet 7.

In conclusion, in accordance with the cable connector provided by the present invention, the first electrical connection portion 18, the second electrical connection portion 19 and the third electrical connection portion 20 including a power supply connection portion, a differential signal connection portion and a sideband signal connection portion are integrated into the same first insulator 1, thus the multi-functional integrated design of the interfaces of the cable connector is achieved, the space is saved, and the product layout is facilitated. Moreover, through the arrangement of the step 4 formed by the first plane 2 and the second plane 3, the first plugging portion 11 and the second plugging portion 12, the first positioning portion 13 and the second positioning portion 17, the stability during plugging and unplugging and assembling can be improved. The second front plugging portion 15 and the second rear plugging portion 16 have different lengths in a length direction of the first insulator 1, thus preventing the cable connector from being reversely plugged.

Second Embodiment

Figure 3:
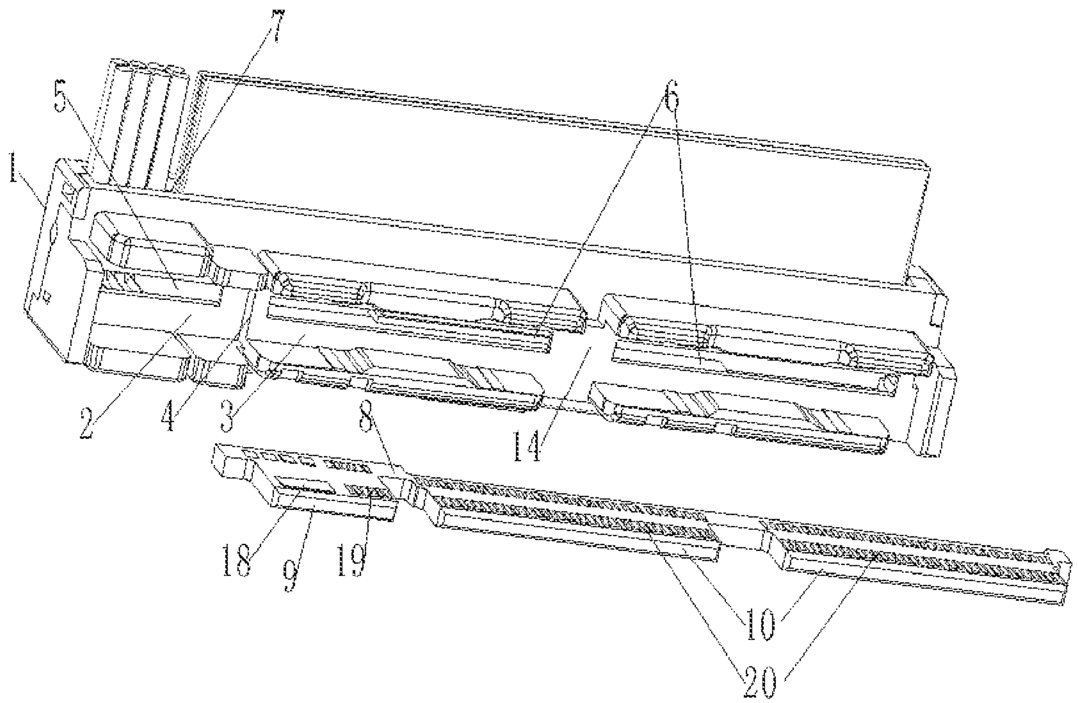
FIG. 3 shows a schematic diagram of an exploded structure of a cable connector in accordance with an embodiment of the present invention.
Figure 4:
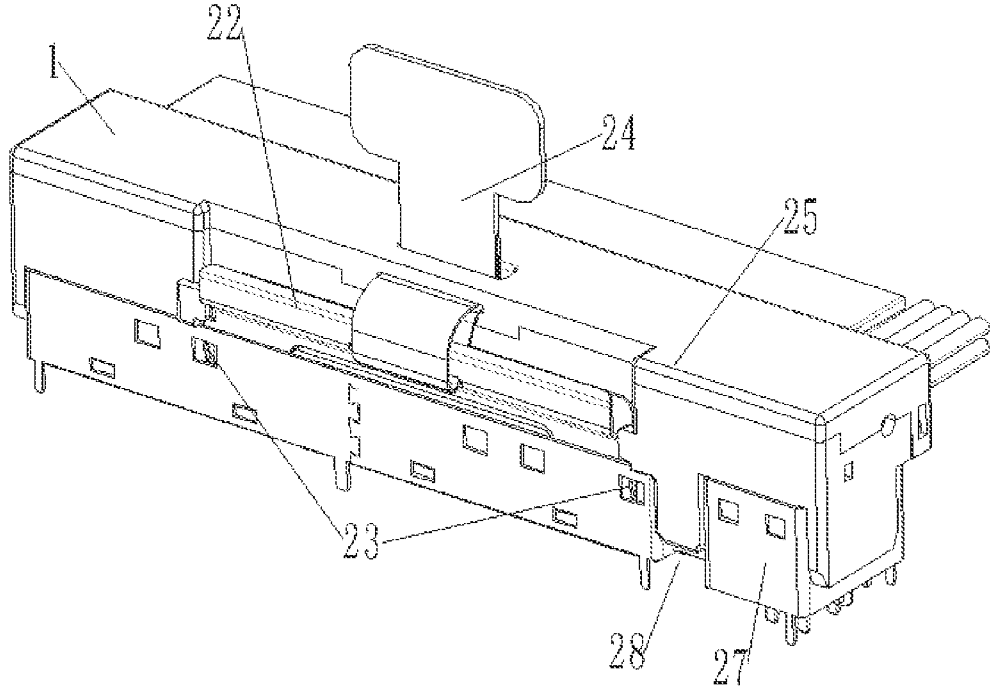
FIG. 4 shows a schematic diagram of a structure of a connector assembly in accordance with a second embodiment of the present invention.

As shown in FIG. 3 and FIG. 4, the present invention further provides a connector assembly. The connector assembly includes the cable connector above and a board connector.

In accordance with the embodiment, the board connector includes:

a second insulator, wherein the upper side of the second insulator is provided with a third plane and a fourth plane in butt joint with the first plane 2 and the second plane 3, respectively, a first terminal set and a second terminal set with the tops exposed to the outside are arranged in the second insulator, and the electrical connection portions on the first plugboard portion 9 and the second plugboard portion 10 are in plug-fit with the first terminal set and the second terminal set, respectively; and a housing 27, sleeved outside the second insulator, wherein a first plugging slot and a second plugging slot are formed between at least one of the front side face and the rear side face of the second insulator and the housing 27, at least part of the front end face and/or the rear end face of the housing 27 is recessed inwards to form a positioning slot 28, and the first plugging portion 11, the second plugging portion 12 and the first positioning portion 13 are in plug-fit with the first plugging slot, the second plugging portion and the positioning slot 28, respectively.

Specifically, as the board connector integrated with the first terminal set and the second terminal set is used by the connector assembly to be in plug-fit with the cable connector above, the connector assembly achieves the integrated plugging, which is not only saved in space and easy to assemble, but also can keep the outgoing cables neat. Through the arrangement of the third plane and the fourth plane, the first plugging slot, the second plugging slot and the positioning slot 28 on the board connector, the board connector forms a multi-directional plug-fit with the cable connector, and the stability of the connector assembly during plugging and unplugging and assembling is improved.

Third Embodiment

Figure 5:
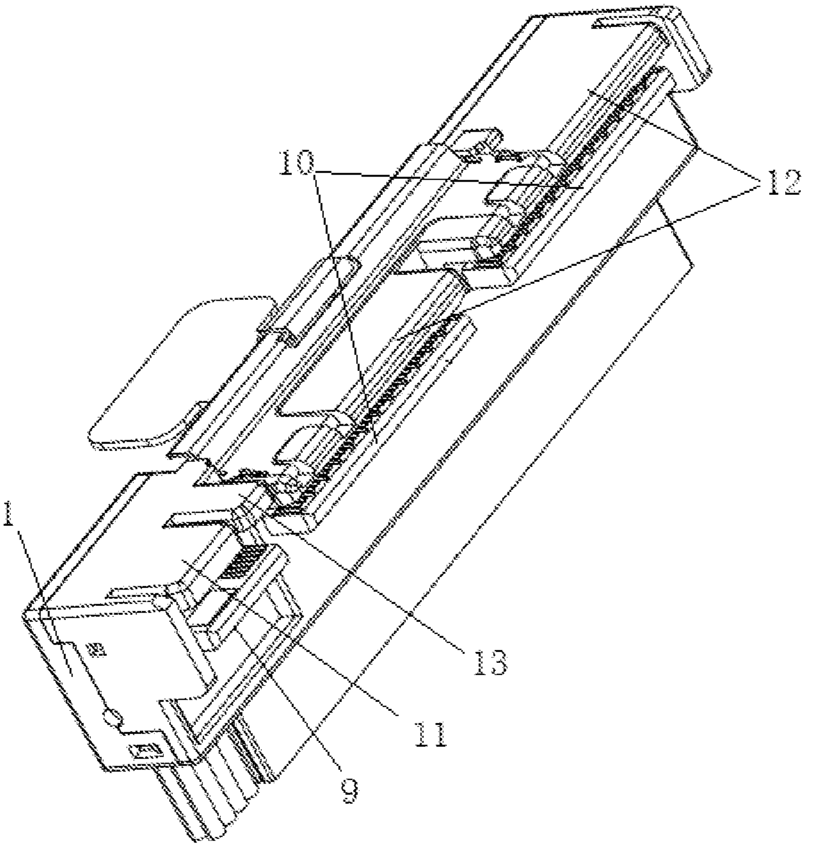
FIG. 5 shows a schematic diagram of a three-dimensional structure of a cable connector in accordance with a third embodiment of the present invention.
Figure 6:
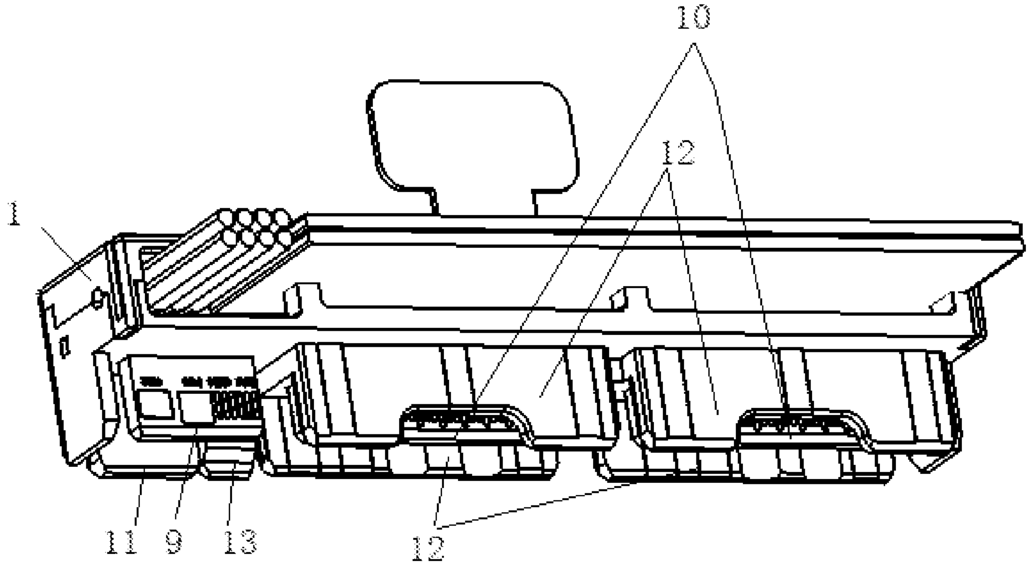
FIG. 6 shows a schematic diagram of a three-dimensional structure of another cable connector in accordance with a third embodiment of the present invention.

As shown in FIG. 5 to FIG. 6, the difference between the embodiment and the first embodiment is as follows:

In accordance with the embodiment, the first plugging portion 11 is arranged on the front side of the first plugboard portion 9, and the second plugging portion 12 is arranged on at least the front side of each of the second plugboard portions 10.

Specifically, as shown in FIG. 5, the first plugging portion 11 is only arranged on the front side of the first plugboard portion 9, and the second plugging portion 12 is only arranged on the front side of each of the second plugboard portions 10; or as shown in FIG. 6, the first plugging portion 11 is only arranged on the front side of the first plugboard portion 9, and the second plugging portions 12 are arranged on the front side and the rear side of each of the second plugboard portions 10.

Fourth Embodiment

Figure 7:
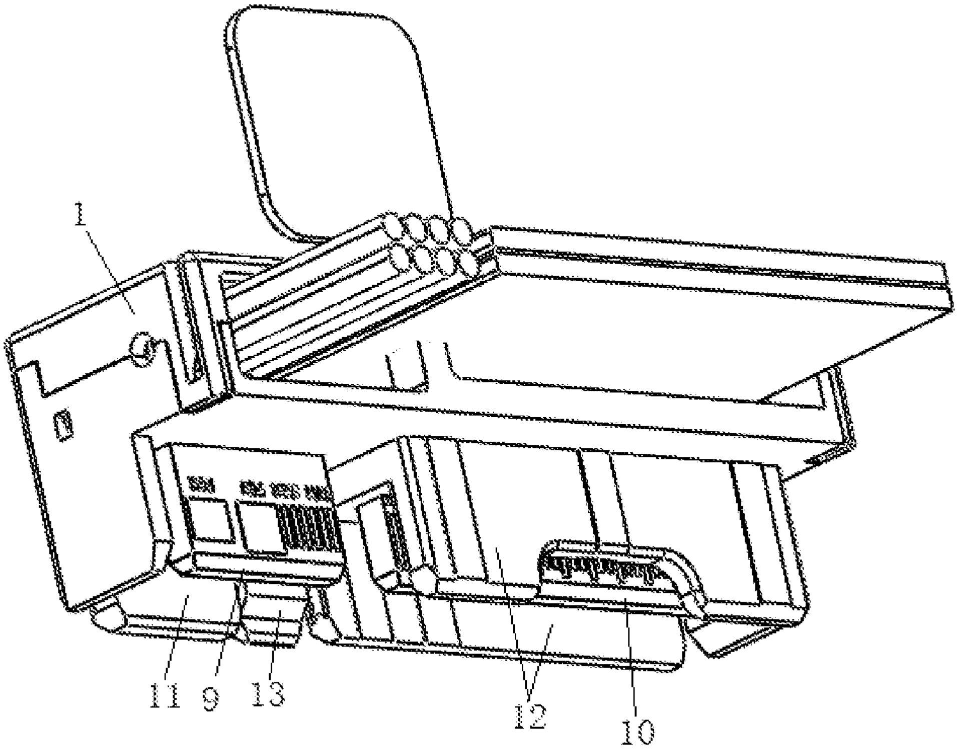
FIG. 7 shows a schematic diagram of a three-dimensional structure of a cable connector in accordance with a fourth embodiment of the present invention from one perspective.
Figure 8:
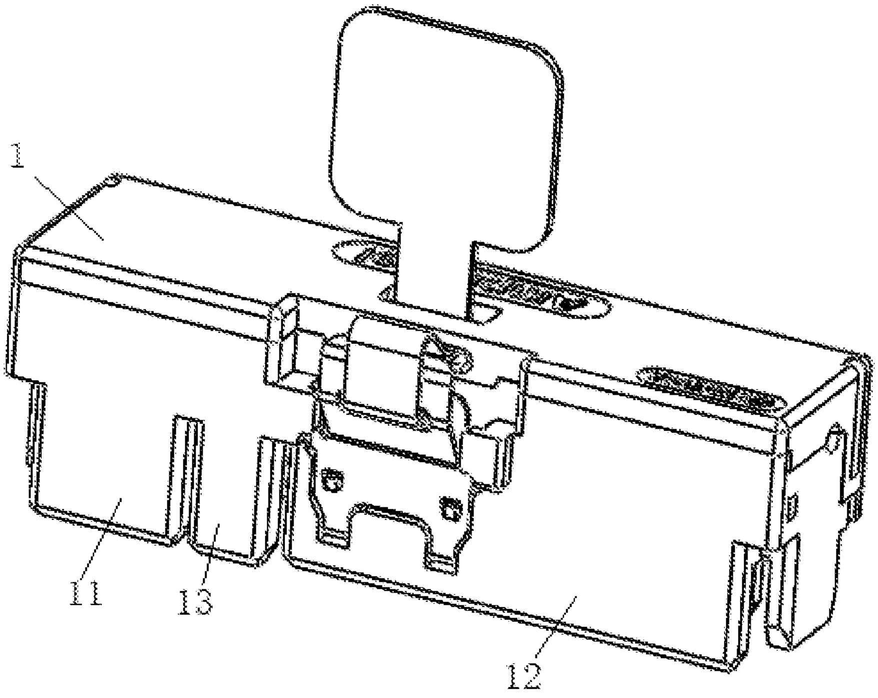
FIG. 8 shows a schematic diagram of a three-dimensional structure of a cable connector in accordance with a fourth embodiment of the present invention from another perspective.

As shown in FIG. 7 and FIG. 8, the difference between the embodiment and the first embodiment is as follows:

In accordance with the embodiment, there is one second plugboard portion 10.

Specifically, as shown in FIG. 7, the cable connector in the embodiment is only provided with one second plugboard portion 10. The second plugboard portion 10 is provided with a third electrical connection portion 20, and the front side and the rear side of the second plugboard portion 10 are provided with the second plugging portions 12. The size of the cable connector is smaller than that of the cable connector in the third embodiment, and thus the plugging strength and the plugging stability can be guaranteed by arranging the first plugging portion 11 on one side of the first plugboard portion 9.

Furthermore, to adapt to the cable connector in the embodiment, the structure of the lock latch thereof is as shown in FIG. 8.

Fifth Embodiment

Figure 9:
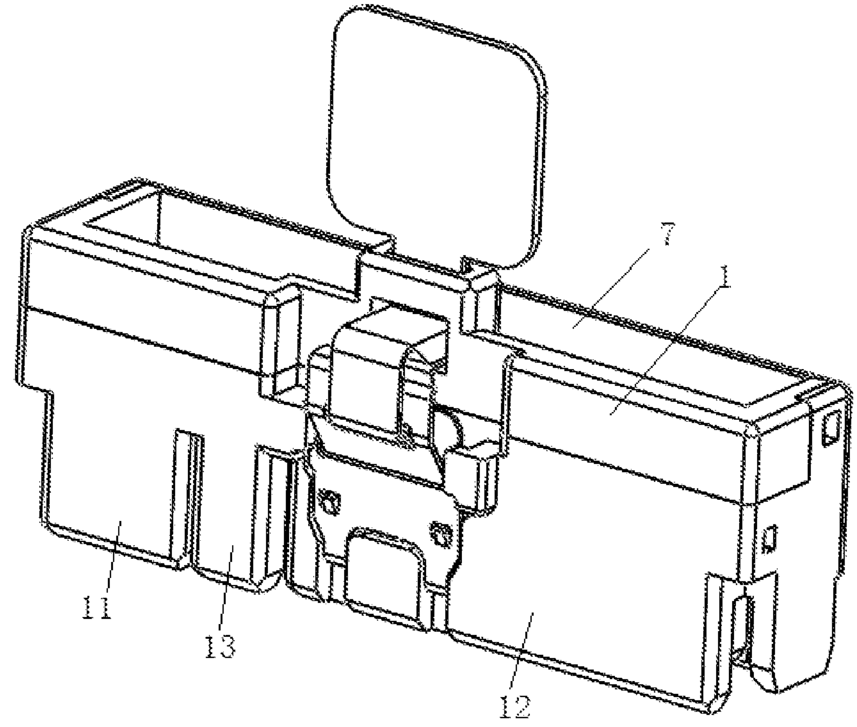
FIG. 9 shows a schematic diagram of a three-dimensional structure of a cable connector in accordance with a fifth embodiment of the present invention.
Figure 10:
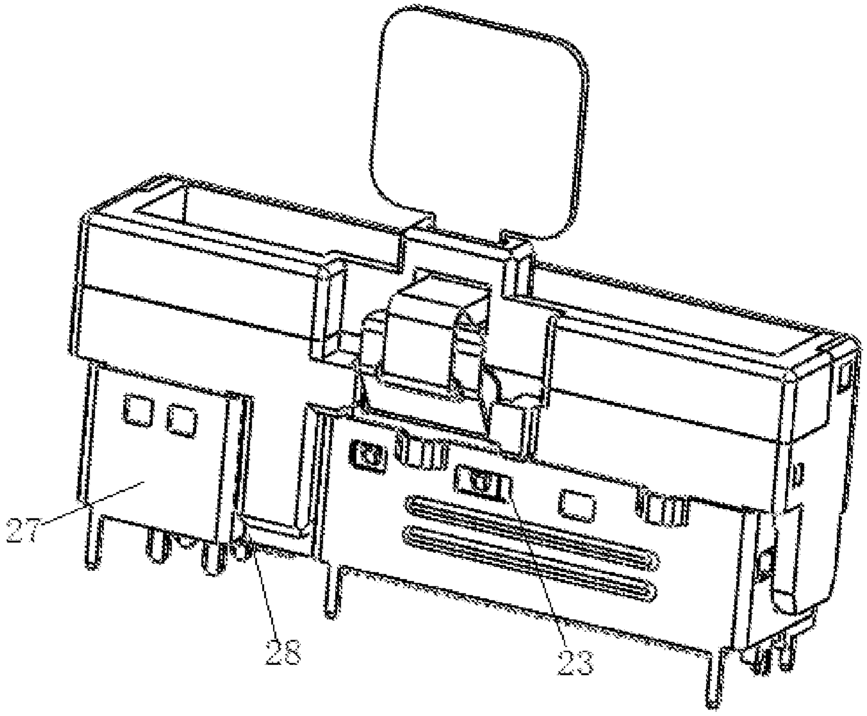
FIG. 10 shows a schematic diagram of a three-dimensional structure of a connector assembly in accordance with a fifth embodiment of the present invention.

As shown in FIG. 9 and FIG. 10, the difference between the embodiment and the fourth embodiment is as follows:

In accordance with the embodiment, the cable outlet 7 is formed in the top of the first insulator 1.

Specifically, the cable connector may achieve top vertical outgoing through the cable outlet 7, so that the plugging space can be saved more during use, and more cable connectors may be plugged into a plugging region with the same area.

Further, the cable connector in the embodiment can be in plug-fit with the corresponding board connector thereof to form a connector assembly as shown in FIG. 10.

The embodiments of the present invention have been described above, and the foregoing description is illustrative, not limiting, and not limited to the disclosed embodiments. Numerous modifications and changes will be apparent to those skilled in the art without departing from the scope and spirit of the illustrated embodiments.

What is claimed is:

1. A cable connector, comprising:

a first insulator, wherein the lower side of the first insulator is provided with a first plane and a second plane, a vertical height of the first plane is higher than that of the second plane, a step is formed at a joint of the first plane and the second plane, an accommodating groove is formed in the first insulator, the first plane is provided with a first groove opening communicating with the accommodating groove, the second plane is provided with at least one second groove opening communicating with the accommodating groove, and one side face of the insulator is provided with a cable outlet communicating with the accommodating groove;

a printed circuit board, arranged in the accommodating groove, wherein a lower end of the printed circuit board is provided with a first plugboard portion and at least one second plugboard portion, the first plugboard portion and the second plugboard portion respectively penetrate through the first groove opening and the second groove opening and extend downwards, and the first plugboard portion and the second plugboard portion are both provided with electrical connection portions;

a first plugging portion and a second plugging portion, respectively arranged on the lower sides of the first plane and the second plane and extending downwards; and a first positioning portion, arranged on the lower side of the first plane and extending downwards, wherein the first positioning portion is located between the first plugging portion and the second plugging portion.

2. The cable connector according to claim 1, wherein a partition portion is arranged between the adjacent second groove openings, and a first clearance is provided between the adjacent second plugboard portions.

3. The cable connector according to claim 1, wherein the first plugging portions are arranged on the front side and the rear side of the first plugboard portion, and the second plugging portions are arranged on the front side and the rear side of each of the second plugboard portions.

4. The cable connector according to claim 1, wherein the first plugging portion is arranged on the front side of the first plugboard portion, and the second plugging portion is arranged on at least the front side of each of the second plugboard portions.

5. The cable connector according to claim 1, wherein there is one second plugboard portion.

6. The cable connector according to claim 1, wherein a second clearance is provided between the adjacent second plugging portions.

7. The cable connector according to claim 1, wherein the second plugging portion comprises a second front plugging portion located on the front side of the second plugboard portion and a second rear plugging portion located on the rear side of the second plugboard portion, and the second front plugging portion and the second rear plugging portion have different lengths in a length direction of the first insulator.

8. The cable connector according to claim 3, wherein the first positioning portion is arranged on the front side and the rear side of the first plugboard portion, a third clearance is provided between the first positioning portion and the first plugging portion adjacent to the first positioning portion, and a fourth clearance is provided between the first positioning portion and the second plugging portion adjacent to the first positioning portion.

9. The cable connector according to claim 1, further comprising two second positioning portions, wherein the two second positioning portions are respectively arranged on the left side face and the right side face of the first insulator and extend downwards, a fifth clearance is provided between one of the second positioning portions and the first plugging portion, and a sixth clearance is provided between the other of the second positioning portions and the second plugging portion.

10. The cable connector according to claim 9, wherein the second positioning portion is platy.

11. The cable connector according to claim 1, wherein the first plugging portion and the second plugging portion are platy, and the first positioning portion is columnar.

12. The cable connector according to claim 1, wherein the electrical connection portions comprise a first electrical connection portion, a second electrical connection portion and a third electrical connection portion; the first electrical connection portion and the second electrical connection portion are arranged on the first plugboard portion, a seventh clearance is provided between the first electrical connection portion and the second electrical connection portion; and each of the third electrical connection portions is arranged on one of the second plugboard portions.

13. The cable connector according to claim 12, wherein the first electrical connection portion, the second electrical connection portion and the third electrical connection portion are connected to a first cable, a second cable and a third cable, respectively; and the first cable, the second cable and the third cable extend out via the cable outlet.

14. The cable connector according to claim 1, wherein there are two second plugboard portions.

15. The cable connector according to claim 1, wherein the front side of the second plugboard portion is provided with a mounting groove, a lock latch is arranged in the mounting groove, the lock latch comprises a lock plate bent into a U shape, one face of the lock plate is clamped into the mounting groove, the other face of the lock plate is a free end exposed to the outside, the outer side of the other face of the lock plate is provided with a convex lock tab, and an upper end of the other face of the lock plate is provided with a pull tab.

16. The cable connector according to claim 1, wherein the front side face of the first insulator is provided with a protruded portion, the first plugging portion and the first positioning portion are arranged at the bottom of the protruded portion.

17. The cable connector according to claim 1, wherein one side face of the first insulator is provided with a cylindrical portion extending outwards, and the cylindrical portion is arranged on the periphery of the cable outlet and surrounds the cable outlet.

18. A connector assembly, comprising the cable connector according to claim 1, and a board connector.

19. The connector assembly according to claim 18, wherein the board connector comprises:

a second insulator, wherein the upper side of the second insulator is provided with a third plane and a fourth plane in butt joint with the first plane and a second plane, respectively, a first terminal set and a second terminal set with the tops exposed to the outside are arranged in the second insulator, and the electrical connection portions on the first plugboard portion and the second plugboard portion are in plug-fit with the first terminal set and the second terminal set, respectively; and a housing, sleeved outside the second insulator, wherein a first plugging slot and a second plugging slot are formed between at least one of the front side face and the rear side face of the second insulator and the housing, at least part of the front end face and/or the rear end face of the housing is recessed inwards to form a positioning slot, the first plugging portion, the second plugging portion and the first positioning portion are in plug-fit with the first plugging slot, the second plugging slot and the positioning slot, respectively.

* * * * *